United States Patent [19]

Reynolds

[11] 4,316,097
[45] Feb. 16, 1982

[54] BACKUP POWER CIRCUIT

[76] Inventor: William R. Reynolds, c/o Electronic Systems & Components, Inc., 110 Summit Ave., Chatham, N.J. 07928

[21] Appl. No.: 103,735

[22] Filed: Dec. 14, 1979

[51] Int. Cl.³ .............................................. B66B 5/02
[52] U.S. Cl. .................................... 307/66; 187/29 R
[58] Field of Search ....................... 307/66; 187/29 R; 320/40

[56] References Cited

U.S. PATENT DOCUMENTS

| | | | |
|---|---|---|---|
| 2,606,217 | 8/1952 | Raine et al. ............................ | 307/64 |
| 3,348,118 | 10/1967 | Watrous ................................. | 320/40 |
| 3,469,657 | 9/1969 | Sgroi ..................................... | 197/29 R |
| 3,532,186 | 10/1970 | Swartzell ............................. | 187/29 R |
| 3,706,357 | 12/1972 | Simpson ............................... | 187/29 R |
| 3,902,573 | 9/1975 | Grove et al. ......................... | 187/29 R |

*Primary Examiner*—Lawrence R. Franklin
*Assistant Examiner*—James L. Dwyer
*Attorney, Agent, or Firm*—Pearne, Gordon, Sessions, McCoy & Granger

[57] ABSTRACT

A battery pack-containing solid state circuit, normally in a standby condition, automatically applies battery-generated power to a multi-power requirement load a predetermined time period subsequent to detection of a malfunction in the load's normal power source. In switching to its power-applying state, the circuit disconnects the load from its malfunctioning power source and energizes the load at a level consistent with the battery pack capabilities. The circuit includes a unique foldback-characterized, overcurrent-protected inverter and a temperature-compensated battery charger. A low battery voltage sensor exhibiting hysteresis characteristics inhibits operation of the circuit when the battery voltage drops below a predetermined level indicative of a discharge condition, the low voltage sensor continuing to inhibit operation of the circuit until a battery voltage charging input regains a level in excess of the predetermined level at which the discharged battery initially inhibited circuit operation. Restoration of normal power resets the circuit to a standby condition after a predetermined time period. The circuit finds particular application as an emergency power unit to effect lowering of an hydraulic elevator car and release of passengers therefrom.

9 Claims, 6 Drawing Figures 4,316,097

BACKUP POWER CIRCUIT

BACKGROUND OF THE INVENTION

The present invention relates in general to an automatically actuated backup power circuit for at least partially energizing a multi-power requirement load upon loss of or malfunction of its primary power source.

More particularly, the present invention is directed to a battery pack containing standby emergency power supply adapted to partially energize a hydraulic elevator control panel experiencing a malfunction in its normal power supply wherein lowering of the elevator car and opening of the car doors are effected to permit safe egress of passengers therefrom.

Such standby emergency power supplies are known in the art, as illustrated by U.S. Pat. Nos. 3,532,186; 3,706,357; and 3,902,573. These known circuits, being complex, costly, and of a generally electromechanical nature with inherent reliablility problems, have not, to the best of the present inventor's knowledge, met with commercial success.

SUMMARY OF THE INVENTION

The present invention provides a highly reliable, low cost, solid state backup power circuit for automatically energizing a multi-power requirement load upon failure of its primary power source.

The backup power circuit includes a direct current source, for example, a gel-cell battery pack. A power loss detection circuit is connected to monitor a power parameter of the load, a predetermined change in the power parameter from its normal condition causing the power loss detection circuit to generate a fault signal.

A solid state timer means responsive to the fault signal provides a trigger signal a predetermined time period after the generation of the fault signal, the triggering signal continuing for a predetermined time period subsequent to the termination of fault signal generation by the power loss detection circuit.

A solid state inverter means is connected to the direct current source and is responsive to the trigger signal, the inverter means providing an alternating current output during the generation of the trigger signal by the timer means.

A step-up transformer means connected to the alternating current output of the inverter provides alternating current to the load at a voltage exceeding that of the alternating current output of the inverter. A rectifier means connected to the transformer means provides direct current to the load at a voltage exceeding that of the direct current source.

Relay means responsive to operation of the inverter means is actuated, generally simultaneously with the inverter means, to disconnect from the primary power source those portions of the load energized by the current outputs of the transformer and rectifier means.

In a preferred form, the inverter of the backup power circuit is overcurrent-protected by a unique feedback control means which automatically shunts triggering signals away from the power switches of the inverter to preclude their complementary, commutation-like switching under overload conditions indicated by the lack of a blocking signal which normally precludes trigger signal shunting away from the inverter switches.

Where the direct current source of the backup power circuit is a rechargeable battery, the backup power circuit in a preferred form includes a unique temperature-compensated battery charger having a battery charger circuit providing increasing current to a charging battery as its terminal voltage increases. When the terminal voltage reaches a predetermined value, the charging current decreases to a minimum amount. The predetermined value of terminal voltage and the amount of charging current per unit of terminal voltage applied by the charger circuit to the charging battery is varied by a control voltage input. Sensing means responsive to battery temperature provides the control voltage input to the battery charger circuit, wherein the predetermined value of terminal voltage and the amount of charging current per unit of terminal voltage applied by the charger circuit to the charging battery is a function of sensed battery temperature.

BRIEF DESCRIPTION OF THE DRAWINGS

Other objects and a fuller understanding of the invention may be had by referring to the following description and claims, taken in conjunction with the accompanying drawings.

DETAILED DESCRIPTION OF THE PREFERRED EMBODIMENTS

Figure 1:
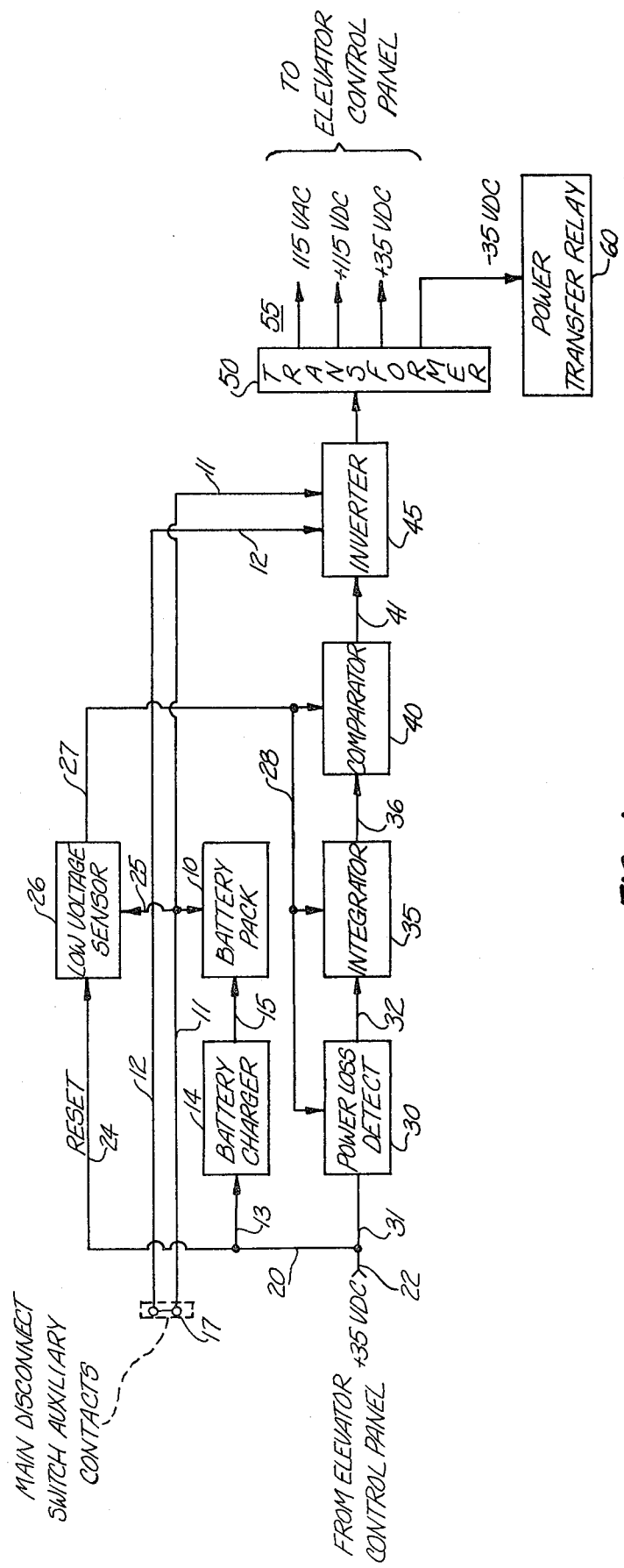
FIG. 1 is a schematic block diagram of a backup power circuit in accordance with the present invention.

The block diagram of FIG. 1 illustrates application of the present invention as an emergency backup power circuit for a hydraulic elevator, where, upon loss of or malfunction of the elevator primary power source, the backup power circuit partially energizes the elevator control panel to effect lowering of the elevator car and opening of its door for the safe egress of passengers therefrom. It should be noted that the present invention clearly is not limited to the illustrated application. For example, it is within the contemplation of the inventor that the present invention could be applied as an automatically activated backup power source for electronic computers, telemetry installations, or the like.

The backup power circuit of FIG. 1 includes a direct current source such as a gel cell battery pack 10 providing, for example, +24 volt DC power to a direct current output 11, the electrical ground or neutral of the battery constituting a direct current return. In the illustrated application of the invention as an emergency power backup for a hydraulic elevator, the direct current output 11 is fed through a disable switch 17 to provide the +24 volt DC power on a direct current supply buss 12 which supplies current to the control portion of an inverter 45, to be subsequently discussed, the direct current output 11 supplying DC current to the power output portion of the inverter 45. The disable switch 17 functions in a conventional manner to preclude operation of the backup power circuit of FIG. 1 where the main disconnect switch (not shown) supplying primary power to the elevator control panel has been thrown to a disconnect position to, for example, permit maintenance of the associated hydraulic elevator system. Under these conditions, emergency power application to the elevator control panel is not desired, and the disable switch 17 in opening simultaneously with the main disconnect switch precludes the application of emergency power supplied by the battery pack 10 to the direct current supply buss 12 and thus precludes operation of the inverter 45.

Normally, the backup power circuit is in a standby condition (disconnect switch 17 closed as illustrated) monitoring normal operation of the elevator control panel. During such standby condition, the battery pack is maintained at a fully charged level by a battery charger 14 in a preferred form of a temperature-compensated battery charger in accordance with the invention, such unique charger to be subsequently illustrated and discussed in detail.

A charging current input 15 provided by the battery charger 14 is fed to the battery pack 10 to maintain it at a fully charged level. A battery charger power input 13 is supplied from an input power buss 20, in turn energized by a power parameter input 22 connected to, for example, a 35-volt DC point in the elevator control panel to which backup power is to be applied. This 35-volt DC power parameter, existent in a typical hydraulic elevator power supply circuit, is monitored to determine the normal or abnormal status of the elevator control panel primary power source which typically is single-phase or threephase 60 Hz AC power at a normal 110 or 220 volts AC. The 35-volt DC power parameter, in addition to constituting a power malfunction indication signal input to the backup power circuit, also, under normal power conditions, provides voltage and current to the battery charger 14 to effect charging of the battery pack 10. The 35-volt DC power parameter input is monitored by a power loss detect circuit 30 which provides a fault signal output 32 upon the loss of or detected malfunctioning of the power parameter input 22. The fault signal output 32 in turn is applied to an integrator 35 providing a ramp signal output 36 fed to a comparator 40, which provides a trigger signal output when the ramp signal output of the integrator 35 reaches a predetermined value less than its maximum value. A trigger signal output 41 in turn energizes an inverter 45, preferably in the form of a foldback characterized overcurrent-protected inverter in accordance with the invention, such unique inverter to be subsequently illustrated and discussed in detail. The inverter 45 chops DC current provided by the battery pack 10 and applies it to a step-up transformer means 50 (including rectifier means connected to a portion of the transformer secondary windings), providing multioutput power to the elevator control panel as illustrated. The transformer means 50 also supplies energizing voltage to a power transfer relay 60 which disconnects from the primary power source those portions of the load (elevator control panel circuit) that are to be energized by the emergency backup power circuit. The power transfer relay 60 also preconditions internal relays of the elevator control panel to effect an emergency rescue operation. The functions of the power transfer relay 60 are well known in the art, and do not require a detailed explanation.

In accordance with the invention, the integrator 35 and comparator 40 function as a timer, wherein generation of a fault signal at the fault output 32 is, in effect, applied to energize the inverter 45 at the trigger signal output 41 a predetermined time period after the detection of a power loss or power malfunction condition. Such a feature permits a trial period of time, such as four seconds, wherein clearing of a fault in the primary power source to the elevator control panel and reapplication of normal power to it could take place without energizing the backup power circuit. Conversely, the integrator 35 and comparator 40, acting as a timer, provide a four-second time period between the re-establishment of normal power to the elevator control panel and the disconnecting of the emergency power backup circuit from it. The exact operation of the integrator 35 and the comparator 40 will be subsequently discussed.

As discussed above, upon a loss of or detected manfunction of the power parameter input 22, the inverter 45, after a predetermined time delay period, at least partially energizes the load in the illustrated form of the elevator control panel. Under these conditions, all such emergency power is provided solely by the battery pack. It can be seen that extensive use of the backup power system by, for example, repeated sequential lowering of the elevator car from floor to floor during a series of intermittent primary power outages over a short time period could result in deep discharge of the battery, thereby shortening its life. To preclude such deep discharge of the battery pack 10, a low voltage sensor 26 is provided, the sensor having a normal low impedance current passing state and a high impedance current blocking state. The low voltage sensor 26 monitors and controls a power input line 25 carrying the battery pack voltage (+24 volts DC). Upon the loaded down battery pack voltage dropping to, for example, +20 volts DC from a nominal +24-volt DC fully charged condition, the low voltage sensor 26 will switch to its high impedance current blocking state and turn off the backup power circuit by turning off its power output 27, which supplies operating power to the power loss detect circuit 30, the integrator 35, and the comparator 40. In effect, the low voltage sensor is series inserted between the battery pack 10 and the circuits which it powers, namely the power loss detect circuit 30, the integrator 35 and the comparator 40. Such action, in turn, shuts off the inverter 45 to preclude powering of the elevator control panel through the transformer means 50. Under these conditions, the unloaded battery pack 10 will rapidly return to an open circuit voltage of approximately +24-volt DC. The low voltage sensor 26, by design, will not turn on (switch to its normal low impedance current passing state) at the +24-volt DC level of the unloaded battery, but rather will only turn on at a high reset voltage input. It can be seen that the low voltage sensor 26 presents hysteresis characteristics wherein it shuts off the circuit at a battery voltage of 20 volts and will not re-energize the circuit until a reset line 24 applies a voltage to the low voltage sensor 26 in excess of the nominal +24-volt DC open circuit voltage of the discharged battery. Such a hysteresis feature advantageously precludes cycling of the backup power circuit under low battery conditions.

It can be seen that the backup power circuit illustrated in general by FIG. 1 automatically energizes a multipower requirement load in the form of an elevator control panel on failure of its primary power source. The direct current source in the form of the battery pack 10 provides auxiliary backup power. The power loss detection circuit 30 monitors the power parameter of the load in the form of the +35-volt DC supplied by the elevator control panel under normal operating conditions. On a predetermined change in such power parameter from its normal condition, the power loss detect circuit 30 generates a fault signal, which is provided to the solid state timer means in the form of the integrator 35 and comparator 40, which in turn generate a trigger signal to the inverter a predetermined time period after the generation of the fault signal. Under these conditions, the inverter provides an alternating current output during generation of the trigger signal by the timer means (integrator 35 and comparator 40) to effect emergency powering of the elevator control panel via the step-up transformer 50. Upon re-establishment of normal power to the elevator control panel, the power backup circuit, after a predetermined time period determined by the integrator 35 and the comparator 40, will switch back to a standby condition and effect reconnection of the elevator control panel to its normal power source by de-energization of the power transfer relay 60.

Figure 2:
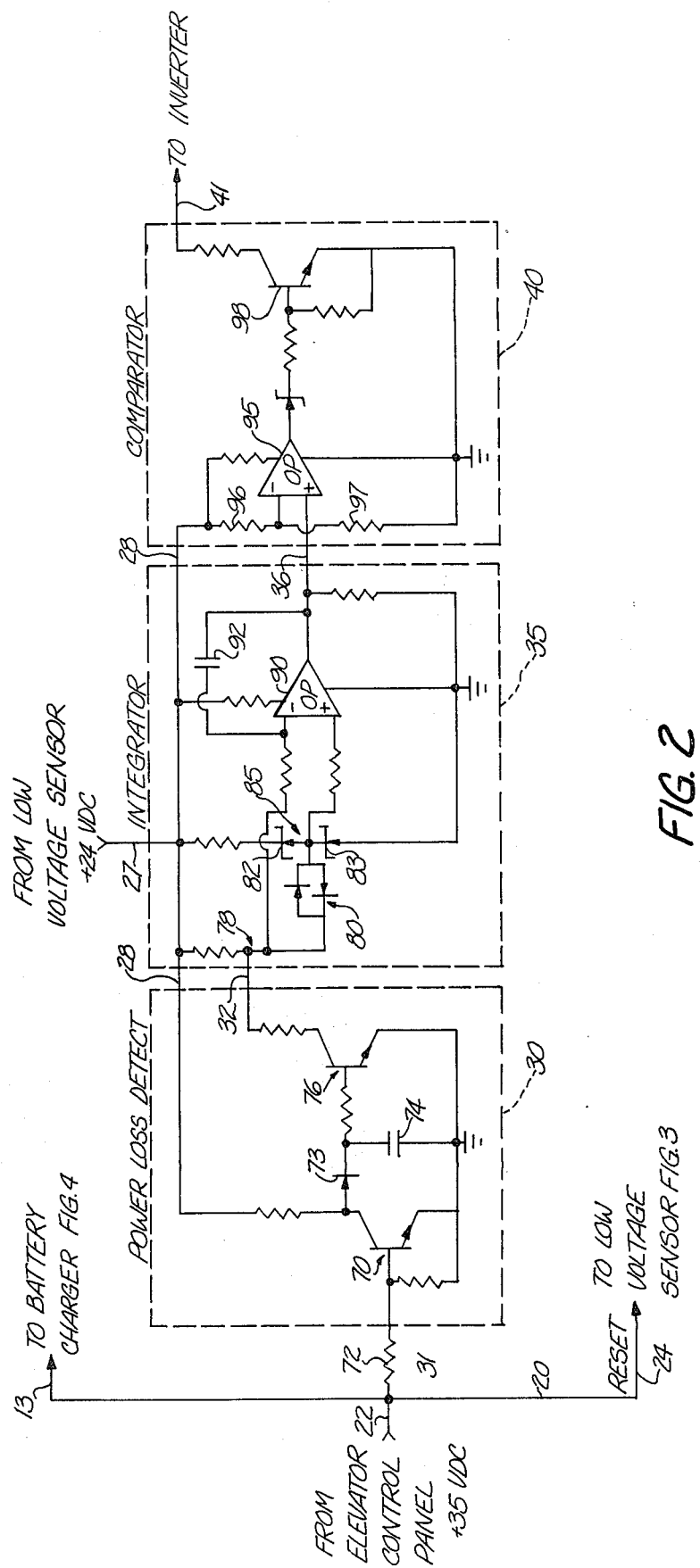
FIG. 2 is a detailed, schematic diagram of power loss detect, integrator, and comparator circuits suitable for use in the block diagram circuit illustrated in FIG. 1.

Turning to FIG. 2, there is illustrated, in detailed schematic diagram fashion, a suitable power loss detect circuit 30, integrator circuit 35, and comparator circuit 40, for incorporation into the preferred embodiment of the invention as illustrated by the block diagram of FIG. 1.

With particular reference to the left side of FIG. 2, the power parameter input 22, normally carrying +35 volts DC from the elevator control panel, is connected to a monitoring input line 31, which includes a series-inserted current-limiting resistor 72, through which is provided limited DC current to the power loss detection circuit 30 having a power loss detect transistor 70. The collector of the power loss detect transistor 70 is provided with operating voltage from the output power buss 28 as illustrated, the energization of which is controlled (via power output 27) by the low voltage sensor 26 discussed earlier. The emitter of the power loss detect transistor 70 is grounded (current return of battery pack 10), while its base is provided with the power parameter input (+35 VDC) from the elevator control panel. The collector of the power loss detect transistor 70 is also connected to the high side of a power loss indicating capacitor 74 (low side to ground) via a charging diode 73, as illustrated. The high side of the capacitor 74, in turn, is connected to the base of a fault signal generating transistor 76, also having a grounded emitter and a collector connected to the fault signal output 32.

The operation of the illustrated power loss detect circuit 30 will now be discussed. Under normal conditions, the applied 35-volt DC power parameter input to the base of the power loss detect transistor 70 causes it to switch to and maintain a fully conducting condition wherein no charging current can be applied to the power loss detecting capacitor 74 via the charging diode 73. Upon loss of the 35-volt DC power parameter input, the power loss detect transistor 70 turns off (switches to a non-conducting condition) to effect charging of the power loss indicating capacitor 74. Upon the voltage across the capacitor 74 reaching a predetermined value, the fault signal generating transistor 76 is switched to a fully conducting condition to ground (via appropriate series resistance as indicated) a fault signal interconnection junction 78 contained within the integrator circuit 35, to be discussed.

It should be noted that the 35-volt DC input parameter, as discussed, is considered to be a relatively steady state 35-volt DC. The power loss detect circuit would also operate as where an abnormal condition in the 35-volt DC input power parameter would be indicated by the establishment of a fully pulsating DC value. For example, in the application of the disclosed invention to a three-phase system, the 35-volt DC power parameter, as a combination of all three rectified phase voltages, generally presents a DC voltage having a ripple in excess of the turn-off voltage of the power loss detect transistor 70. By loss of a phase, for example, the 35-volt DC power parameter becomes a fully modulated pulsating DC value, wherein the power loss detect transistor 70 would cycle on and off (in sync with zero point of pulsating DC voltage) to provide charging pulses to the power loss indicating capacitor 74. The capacitor 74 would charge to the turn on voltage of the transistor 76 to effect generation of a fault signal output 32. It is noted that other power loss detect circuits adapted to monitor power parameters of the load are clearly within the contemplation of the inventor, the illustrated circuit being by way of example only.

Turning to the integrator circuit 35, it can be seen that the fault signal output 32 takes the form of a typical step function (square wave leading or trailing edge), i.e., the fault signal generating transistor 76 of the power loss detect circuit 30 rapidly switches from a voltage drop condition (non-conducting) to a no-voltage drop condition (fully conducting). The integrator circuit 35 includes an integrator configured operational amplifier 90 of conventional design. A pair of reference voltage zener diodes 82, 83, connected in series anode-to-cathode with each other and inserted between the output power buss 28 and electrical ground, provide, for example, a 5.1 volt reference (interconnection junction 85) to the non-inverting input of the operational amplifier 90. The zener diode interconnection junction 85 also has connected to it one end of a pair of antiparallel-connected diodes 80 of equal forward voltage drop having their other end tied to the fault signal interconnecting junction 78. The inverting input of the operational amplifier 90 is connected to the fault signal interconnection junction 78 and to one end of an integrator capacitor 92 having its other end connected to the output of the operational amplifier 90.

Under a normal power condition, i.e., with the fault signal generating transistor 76 in its normal, non-conducting condition, positive voltage (relative to non-inverting input of the operational amplifier 90) is fed to the non-inverting input of the operational amplifier 90. In effect, one of the diodes of the pair 80 provides an approximately +0.6 volt clamping voltage, serving to hold the integrator 35, i.e., at one rail of the operational amplifier output, e.g. +3 volts DC. Upon switching of the fault signal generating transistor 76 to a conducting condition, the fault signal interconnection junction 78 is, in effect, switched to apply negative volts (−0.6 volt clamp from the other diode of the pair 80) to the non-inverting input of the operational amplifier 90 wherein integration occurs to provide a generally linear ramp signal at the output of the operational amplifier 90, the ramp portion of such signal ramp extending from, for example, +3 volts DC to +8 volts DC, i.e., the swing of the integrator is 5 volts. This five-volt swing in the disclosed example takes approximately eight seconds to occur. At the end of such eightsecond period, the operational amplifier output will maintain +8 volts DC.

Upon restoration of the 35-volt DC power parameter to the power loss detect circuit 30, the fault signal generating transistor switches off to again apply positive volts to the non-inverting input of the operational amplifier 90, wherein integration again occurs to provide a generally linear ramp signal swinging from +8 volts to +3 volts, such swing occurring again over an eight-second period. It can be seen that generation of a step function fault signal on output 32 causes generation of a linear ramp signal swinging, for example, from 3–8 volts DC over an eight-second time period. Conversely, extinguishing the fault signal (also a step function) by reapplying a normal power parameter input 22 to the power loss detect circuit 30 causes the integrator 35 to swing over an eight-second interval from +8 volts to +3 volts. Such a ramp signal is provided by the ramp signal output 36 to the comparator circuit 40.

The comparator circuit 40 includes a comparator-connected operational amplifier 95 of conventional design, with its non-inverting input connected to receive the ramp signal on the output 36. The non-inverting input of the operational amplifier 95 is tied to a reference voltage established by the interconnection junction of a pair of reference resistors 96 and 97, which function as a voltage divider in a well known manner. By way of example, the reference voltage value at the inverting input of the operational amplifier 95 is 5.5 volts DC.

Upon generation of the earlier discussed ramp signal on output 36, the output of the operational amplifier 95 will remain off (low DC voltage level) until the voltage on the non-inverting input of the operational amplifier 95 reaches 5.5 volts DC, which is located approximately at the midportion of the ramp voltage swing from 3 volts to 8 volts. When the voltage on the reference voltage inverting input is exceeded by the voltage on the non-inverting input, an output (higher DC voltage level) is generated by the operational amplifier 95 to drive current into the base of a trigger signal generating transistor 98, the transistor 98 switches on to provide the trigger signal output 41 to the inverter 45 discussed earlier with regard to FIG. 1. Conversely, the output of the operational amplifier 95 will turn off (return to low voltage DC level) when its noninverting input drops below 5.5 volts.

It can be seen that the integrator 35 and comparator 40 act together as a solid state timer means to provide a four-second time delay between generation of the fault signal on the line 28 and generation of the trigger signal on line 41. Conversely, the integrator 35 and comparator 40 operate as a solid state timer to maintain the trigger signal on line 41 for four seconds subsequent to termination of the fault signal generated on line 28. This is accomplished by setting the reference value at the inverting input of the operational amplifier 95 of the comparator 40 at a voltage half-way up (mid-portion) the ramp signal (3–8 volts DC or 8–3 volts DC) provided by the integrator 35 in response to a fault signal generated by the power loss detect circuit 30.

Figures 3, 4:
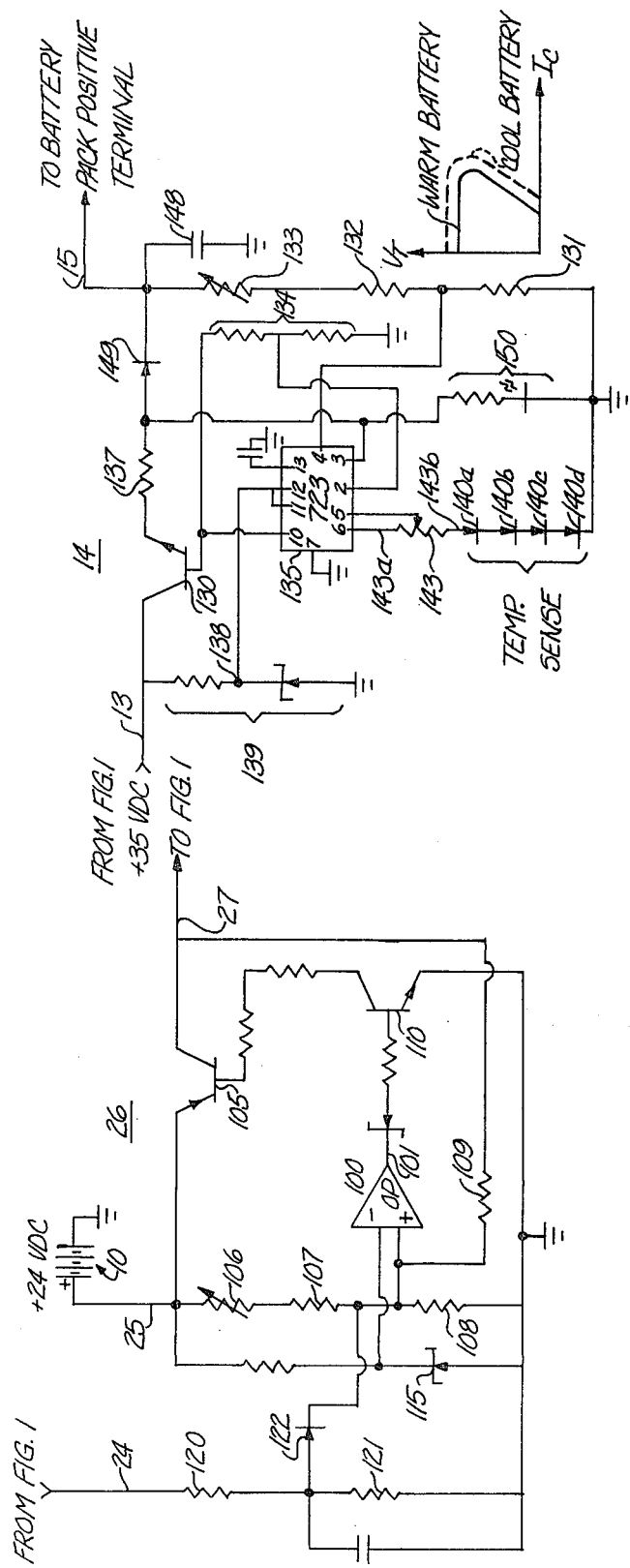
FIG. 3 is a detailed, schematic diagram of a low voltage sensor circuit suitable for use in the block diagram circuit illustrated in FIG. 1.
FIG. 4 is a detailed, schematic diagram of a unique temperature-compensated battery charger in accordance with the present invention and preferred for use in the block diagram circuit illustrated in FIG. 1.

Turning to FIG. 3, there is illustrated an example of a suitable hysteresis characterized low voltage sensor 26 which is connected to the power parameter input 22 via the reset line 24. The battery pack 10 is illustrated as a multi-cell 24-volt DC battery having its positive terminal connected via the power input 25 to the emitter of a power regulating or control transistor 105. The collector of the power control transistor 105 is connected to the power output 27, which provides operating power to the power detect circuit 30, the integrator 35, and the comparator 40, as discussed earlier with regard to FIG. 1. Under normal operating conditions, the control transistor 105 is turned on and held at a fully conducting condition for application of +24 VDC power (less voltage drop across transistor 105 of approximately 1 volt DC or less) to permit operation of the backup control circuit. Under these conditions, the low voltage sensor is at a normal low impedance current passing state. A low voltage sensing function of the circuit of FIG. 3 will now be discussed.

Voltage sensing resistors 106, 107, and 108 are adjusted to provide a reference voltage to the non-inverting input of a low voltage sensing operational amplifier 100. This reference voltage, for example, is set at a low voltage limit of +20 volts DC, such value of battery voltage indicating the discharge of the battery pack 10 under loaded conditions. The inverting input of the low voltage sensing operational amplifier 100 is tied to a reference voltage provided by a reference voltage zener diode 115 fed by the power output 25. It can be seen that the zener diode 115 maintains a relatively stable reference voltage on the inverting input of the operational amplifier 100, while the voltage on the non-inverting input of the operational amplifier 100 will drop under a discharging battery condition. At +20 volts DC, the operational amplifier 100 provides as output 101 (decreasing DC voltage) which turns off a normally conducting base drive transistor 110, which in turn shuts off the power control transistor 105 to preclude circuit operation. The low voltage sensor 26 is now at a high impedance current blocking state. At this point, the battery pack 10 is unloaded and its terminal voltage will rapidly climb to the normal 24-volt DC level. It is desirable that the power control transistor 105 not be re-energized, since cycling on and off of the backup power circuit is indesirable.

To preclude circuit cycling, a feedback resistor 109 is provided between the non-inverting input of the operational amplifier 100 and the power output 27. This feedback resistor 109 functions in a conventional manner to maintain the output of the operational amplifier 100 at a level which maintains non-conduction of the base drive transistor 110, even though the inverting input of the operational amplifier 100 has returned to a voltage indicative of a fully charged battery pack 10. In the illustrated example, the operational amplifier will not be again triggered to permit energization of the power control transistor 105 until the voltage at the non-inverting input of the operational amplifier 100 reaches, for example, 28 volts. It can be seen that the low voltage control circuit of FIG. 3 operates to lock out battery voltage application at a battery discharge point of approximately 20 volts DC. Further, the circuit does not re-energize power application on power output 27 until at least 28 volts is applied to the non-inverting input of the operational amplifier 100. This hysteresis characteristic is advantageously employed to preclude the undesirable cycling of the power backup circuit. To effectively reset the low voltage sensor 26 to its normal low impedance current passing state, there are connected in series reset resistors 120 and 121 energized by the application of the power parameter +35-volt DC voltage on reset line 24. The interconnected junction of the resistors 120, 121 applies, via pass diode 122, a voltage in excess of or equal to the required 28-volt DC to the non-inverting input of the operational amplifier 101 to switch its output to a power applying condition (higher DC volts) wherein power control transistor 105 again conducts. The feedback transistor 109 now holds the circuit in a conducting condition upon removal of the 35-volt DC input on the reset line 24 as long as the battery voltage is maintained above +20 volts DC.

Turning to FIG. 4, there is illustrated, in accordance with the present invention, a unique temperature-compensated battery charger having particular application in the block diagram illustrated and discussed earlier with regard to FIG. 1.

The battery charger circuit utilizes an integrated chip voltage regulator of conventional design pin numbers designated as an LM 723/LM723C, manufactured and distributed by The National Semiconductor Corp., of Santa Clara, California. Power to the chip is provided by a chip power supply network 139, including a zener diode and current limiting resistor the interconnection of which provides a junction 138 feeding voltage to pins 11 and 12 as illustrated. Pin 13 of the chip 135 is connected in a conventional manner to a stability enhancing capacitor 147, which precludes oscillation of the regulator chip 135. Pin 7 of the chip is tied to electrical ground. The battery charger circuit illustrated in FIG. 4 further includes an NPN series pass transistor 130 having its collector connected to the 35-volt DC power parameter input 22 (FIG. 1) and having its emitter connected to supply charging current to the battery charging current input 15 via a current sampling resistor 137 and a back feed preventing diode 149, the input being stabilized by a conventional stability enhancing capacitor 148. Pin 10 of the chip 135 is connected to the base of the series pass transistor 130 and functions to regulate current through it in accordance with battery charging requirements. A charging current sensing input control parameter is provided to pins 2 and 3 of the chip 135 by the voltage drop across the current sampling resistor 137 and the base emitter junction of the pass transistor 130, which is dropped by a conventional resistor ladder 134. A terminal voltage sensing control input is provided to pin 4 of the chip 135 by a voltage divider ladder including series-connected resistors 131, 132, and 133. A power-on indicator 150, including a light-emitting diode as illustrated, provides a visual indication of operation of the charging circuit. Assuming that charging characteristic control input pins 6 and 5 are shorted or have connected across them a fired resistor, the heretofore explained circuit is well known in the art, and operates in a conventional manner as a battery charging circuit providing increasing current to a charging battery as the terminal voltage increases until the terminal voltage reaches a predetermined value determined by the voltage drop across pins 5 and 6 wherein the current decreases to a minimum amount.

The present invention resides in the provision of such conventional circuit with temperature compensation means in the preferred form of four anode-to-cathode, series-connected, temperature-sensitive, semiconductor diodes 140a, 140b, 140c, and 140d, which, in combination with a calibrating potentiometer 143, varies the charging current curve of the battery charger circuit as a function of battery temperature. One end 143a of the potentiometer resistor is tied to pin 6 (constant temperature stable reference voltage) of the chip 135. The other end 143b is tied to the anode end of the series-connected diode 140a, 140b, 140c, and 140d, having their cathode end grounded. The wiper 143 is connected to pine 5 of the chip 135.

It is well known in the art that a cool or cold battery needs to be charged at a higher rate to attain a fully charged condition, (higher terminal voltage, e.g. 26 volts DC) whereas, a warm hot battery needs to be charged at a lower rate to effect a full charge condition (lower terminal voltage, e.g. 24 volts DC). It can be seen from the graph illustrated in FIG. 4 that the maximum terminal voltage and the amount of charging current per unit of increasing terminal voltage are desirably varied in accordance with the sensed temperature of the charging battery. Such circuit characteristics are effected by the variance in the control voltage between pins 5 and 6 of chip 135, caused in turn by variance of the inherent voltage across the diodes 140a, 140b, 140c, and 140d in response to changing temperatures. It can be seen that in accordance with the present invention, the battery charger 14 of FIG. 4 is temperature-compensated to suit ideal charging of a battery at whatever temperature within reasonable limits.

Figure 5:
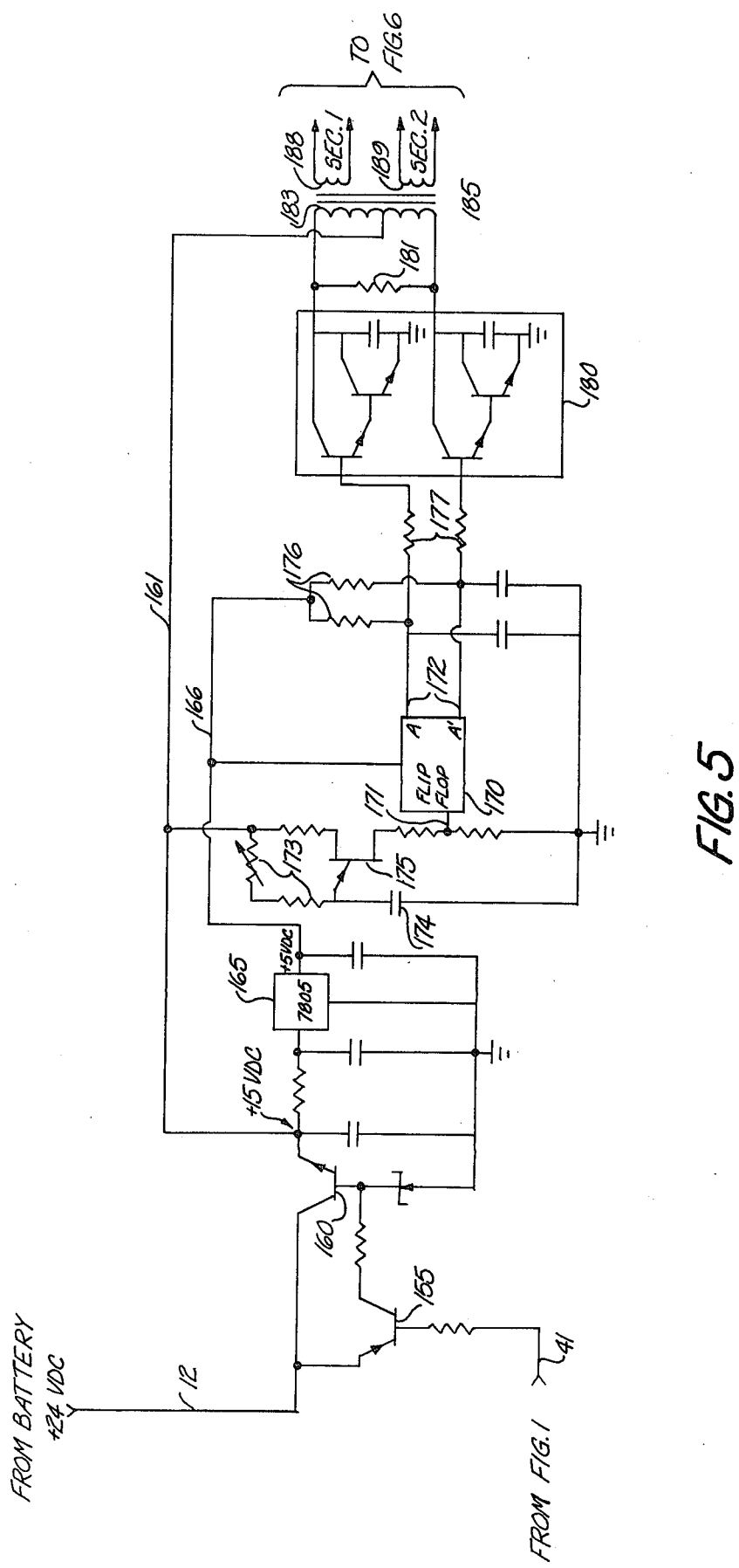
FIGS. 5 and 6 are detailed, schematic diagrams of a unique foldback-characterized, overcurrent-protected inverter in accordance with the present invention and preferred for use in the block diagram circuit illustrated in FIG. 1.

Turning to FIG. 5, there is illustrated a portion of the inverter 45 previously discussed with regard to FIG. 1. In accordance with the invention, the preferred illustrated inverter is a foldback characteristic, overcurrent-protected device providing a highly stable output and efficient power conversion.

Power from the battery pack 10 is conveyed to the inverter on the direct current buss supply line 12 (See FIG. 1). Under normal power conditions, an inverter turn-on transistor 155 is in a non-conducting condition and the inverter circuit is deenergized. Upon receipt from the comparator 40 of the trigger signal input 41, the inverter turn-on transistor 155 is switched to a conducting condition to in turn energize power-regulating transistor 160 to a predetermined degree to establish a relatively stable +15-volt DC supply at its collector. The regulating function and operation of the transistors 155 and 156, having the illustrated zener diode base reference, are well known in the art, and need not be explained in detail. The +15-volt DC-regulated supply is established on a +15-volt DC power buss 161. The +15-volt DC supply powers a conventional type 7805 integrated circuit 5-volt DC supply 165, which in turn supplies +5 volt DC power to a +5-volt DC power bus 166.

The +15-volt DC power is also provided to a conventional relaxation oscillator circuit including a unijunction transistor 175, a pair of RC time constant determining resistors 173, and an RC time constant determining capacitor 174. The elements 173, 174, 175 operate in a conventional manner to provide, at a predetermined frequency such as 120 hertz, a triggering voltage spike fed to a conventional integrated circuit flip-flop 170 having complementary outputs 172 (A and A') as illustrated. A pair of pull-up resistors 176 tied to the complementary outputs 172 (A and A') of the flip-flop 170 function in a conventional manner to provide complementary square waves to a Darlington providing integrated circuit chip 180, also of conventional design. The Darlington chip 180 functions as a high gain amplifier to provide complementary square wave outputs to the ends of a primary side center-taped winding 183 of an inverter trigger signal generating transformer 185. The center tap of the primary winding is tied to the +15-volt DC supply buss 161. It can be seen that alternating energization of the Darlington-connected transistor pairs of the chip 180 causes generation of triggering signal square wave outputs in a first secondary winding 188 and a second secondary winding 189 of the transformer 185. The configuration and operation of the circuit illustrated in FIG. 5 is well known in the art.

Figure 6:
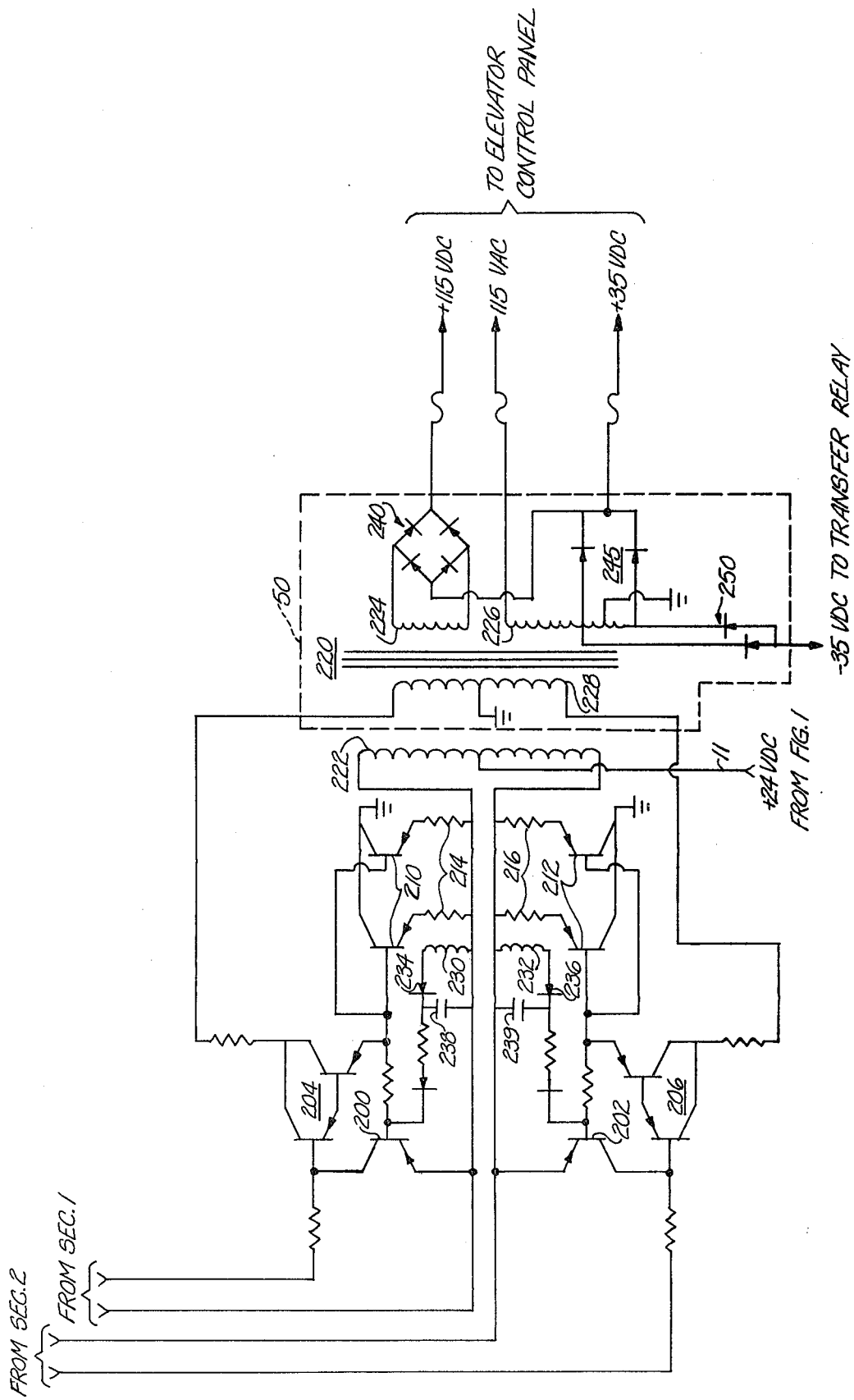

The complementary square wave triggering signals (180 degrees out of phase with each other) from the first and second secondaries 188, 189 of the inverter trigger signal generating transformer 185 are applied, respectively, as illustrated in FIG. 6, to a first semiconductor switch means such as a trigger signal shunting transistor 200, and a second semiconductor switch means such as atrigger signal shunting transistor 202. Under normal conditions, the transistors 200 and 202 are in a non-conducting condition to permit full application of the square wave triggering signals to a first pair of Darlington-connected base drive transistors 204 and a second pair of Darlington-connected base transistors 206. The collectors of the Darlington pairs 204, 205 are connected to the respective ends of a base drive power-generating secondary winding 228 of a step-up output power transformer 220, the winding 228 being center-tapped, as illustrated. The emitter leads of the transistor pairs 204, 205 are connected to drive the bases of unidirectional current power transistor switch pairs 210 and 212 or other suitable solid state power switch devices such as force commutated fast turn-off thyristors. The collectors of the power transistor switch pair 210 and 212 are connected to electrical ground, while their emitters are tied to respective ends of a center-tapped output power primary winding 222 constituting the primary side of the transformer 220, which is center-tapped. The center tap of the winding 222 provided with power (+24 VDC) by the direct current bus supply line 12, as earlier discussed with regard to FIG. 1. In normal operation (transistors 200, 202 non-conducting), the triggering signals from the first and second secondary windings 188, 189 of the inverter trigger signal generating transformer 185 (see FIG. 5) drive in complementary fashion the first and second trigger signal base drive transistor couples 204, 206, which in turn drive into conduction (saturation) the power transistor pairs 210 and 212, which causes generation of alternating current through the primary winding 222. The operation of such inverter circuit configuration as explained to this point is well known in the art.

Upon alternating current flow through the primary winding 222, a plurality of secondary windings are inductively energized. The earlier-discussed base drive power generating secondary winding 228 provides voltage to the transistor pair 204 and 206 to in turn effect complementary firing of the base drive transistor pairs 210 and 212. A first power output voltage step-up secondary winding 224 provides AC power to a full wave bridge rectifier 240, which in turn provides, for example, +115-volt DC power to that section of the elevator control panel requiring such power. A second power output voltage step-up secondary winding 226 is illustrated as providing 115 volts AC. A portion of the winding 226 also energizes a first center-tapped full wave rectifier 245 providing +35 volts DC and a second center tap full wave rectifier providing a negative 35-volt DC to the transfer relay 60 as earlier discussed with regard to FIG. 1. It can be seen that the rectifier means 240, 245, and 250 forming a part of the transformer means 50 (FIG. 1) provide DC power to the elevator control panel at a voltage level in excess of the voltage of the battery pack 10. The transformer secondary winding 226 also provide AC voltage to the elevator control panel at a level in excess of that of the AC current flowing in the primary winding 222.

In accordance with the present invention, overcurrent protection of the inverter is provided by at least one blocking signal generating winding. In the illustrated circuit of FIG. 6, a pair of blocking signal AC generating windings 230, 232 provide, via half-wave rectifier diodes 234, 236, feedback voltage charging capacitors 238, 239. The capacitor in turn maintains a generally steady state voltage that is supplied to the bases of shunting transistors 200 and 202. It can be seen that the windings 230, 232 alternately apply to the base electrodes of the shunting transistors 200, 202 the feedback voltages when their respective power transistor switches 210, 212 are in conducting conditions. Turn-on current to the bases of transistor 200 and 202 is provided by the voltage drops across current sensing resistors 214, 216 in series with the base-emitter junctions of the transistor pairs 210 and 212. Under normal conditions, the base drive current provided by the current sensing resistors 214, 216 is blocked from application to the shunting transistors 200 and 202 by the feedback voltage provided by the windings 130 and 132. Upon an overcurrent condition caused, for example, by shorting of one of the secondary windings 224 or 226, the voltage potential across the feedback windings 131, 132 at least partially collapses or extinguishes to a point to preclude its blocking effect to the turn-on current provided by the current sensing resistors 214, 216 wherein the transistors 200 and 202 are switched on to shunt the triggering signals away from the base input of the Darlington transistor pairs 204 and 206, thus effectively precluding operation of the inverter. The inverter automatically folds back to a current limiting state. Such folding back is also effected by saturation of the core of the transformer 220 caused, for example, by an open circuit in the full wave bridge rectifier 240. Thus, the transformer 220 is protected against overcurrent conditions.

Upon clearing of the fault condition, the voltage across feedback windings 130 and 132 is re-established to effectively once again block application of turn-on current to the shunting transistors 200 and 202, wherein they switch to a non-conducting condition to permit reapplication of the triggering signals to the transistor pairs 204 and 206, wherein chopping of the +24-volt DC supplied by input line 12 is again effected to provide the multipower requirement output to the elevator control panel.

The disclosed backup power circuit has been found to provide, at relatively low cost, a highly reliable and efficient means for at least partially energizing a multipower requirement load such as a hydraulic elevator control panel.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A backup power circuit for automatically energizing a multi-power requirement load upon failure of its primary power source comprising:
 a direct current source;
 a power loss detection circuit connected to monitor a power parameter of the load, a predetermined change in the power parameter from its normal condition causing the power loss detecting circuit to generate a fault signal;

solid state timer means responsive to the fault signal, the timer means providing a trigger signal a predetermined time period after the generation of the fault signal, the triggering signal continuing for a predetermined time period subsequent to the termination of the fault signal generation by the power loss detection circuit;

solid state inverter means connected to the direct current source and responsive to the trigger signal, the inverter means providing an alternating current output during the generation of the trigger signal by the timer means;

step-up transformer means connected to the alternating current output of the inverter, the transformer means providing alternating current to the load at a voltage exceeding that of the alternating current output of the inverter;

rectifier means connected to the transformer means, the rectifier means providing direct current to the load at a voltage exceeding that of the direct current source; and relay means responsive to operation of the inverter means, the relay means being actuated generally simultaneously with energization of the inverter means to disconnect from the primary power source those portions of the load energized by the current outputs of the transformer and rectifier means.

2. A backup power circuit according to claim 1, including a low voltage sensor connected to the direct current source and monitoring its voltage level, the sensor inhibiting operation of the inverter means when the direct current source voltage drops below a predetermined level.

3. A backup power circuit according to claim 1, wherein the timer means includes an integrator having its input connected to receive the fault signal and a comparator having an input connected to the output of the integrator, the output of the comparator generating the trigger signal, the generated fault signal being a step function integrated by the integrator to provide a linear ramp signal of predetermined slope over a predetermined time period, extending between minimum and maximum voltage levels, the comparator generating the triggering signal when the ramp signal exceeds a predetermined value, the comparator ceasing to generate the trigger signal when the ramp signal decreases below the predetermined value.

4. A backup circuit according to claim 3, wherein the predetermined value of the ramp signal is generally at the midportion of its slope and is equal to the reference signal input of the comparator.

5. A backup power circuit for automatically energizing at least a portion of a multi-power requirement load upon failure of its primary power source comprising:
a battery;
a solid state battery charger having its output connected to the battery to effect charging thereof;
a solid state low voltage sensor connected to and in electrical series relationship with the battery, the sensor monitoring the voltage level of the battery, the low voltage sensor having a normal low impedance current passing state and a high impedance current blocking state, the sensor switching to its high impedance current blocking state when the battery voltage drops below a predetermined level;
a solid state power loss detection circuit connected to monitor a power parameter of the load, a predetermined change in the power parameter from its normal condition causing the power loss detection circuit to generate a fault signal, the solid state detection circuit being energized by current from the battery conducted via the low voltage sensor in its normal low impedance current passing state, the low voltage sensor being series-inserted between the battery and the detection circuit power input wherein the low voltage sensor at its high impedance state inhibits operation of the detection circuit to preclude generation of the fault signal when the battery voltage is below the predetermined level;
solid state timer means responsive to the fault signal, the timer means providing a trigger signal a predetermined time period after the generation of the fault signal;
solid state inverter means connected to the battery and responsive to the trigger signal, the inverter providing an alternating current output during the generation of the trigger signal by the timer means;
step-up transformer means having a primary side connected to the alternating current output of the inverter and a secondary side, the transformer means secondary side providing alternating current to the load at a voltage exceeding that of the alternating current output of the inverter;
rectifier means connected to the transformer means secondary side, the rectifier means providing direct current to the load at a voltage exceeding that of the battery; and
relay means responsive to operation of the inverter means, the relay means being actuated generally simultaneously with energization of the inverter means to disconnect from the primary power source those portions of the load energized by the current outputs of the transformer secondary side and the rectifier means.

6. A backup power circuit according to claim 5, wherein the low voltage detection circuit maintains its high impedance current blocking state until a reset voltage applied to the charger circuit exceeds, by a predetermined voltage increment, the predetermined battery voltage level below which the low voltage detection circuit initially switched to its high impedance state.

7. A backup power circuit according to claim 5, wherein the battery charger is energized to provide charging current to the battery and powered by the power parameter in its normal condition monitored by the power loss detection circuit, the power parameter in its normal condition being constituted by a DC voltage derived from the load's primary power source and inputted to the battery charger.

8. A backup power circuit according to claim 7, wherein the input to the battery charger and the input to the power loss detection circuit are electrically connected together, the predetermined change in the power parameter from its normal condition being indicated by a loss of the DC voltage wherein the battery charger is deenergized and the detection circuit generates the fault signal, the detection circuit being energized solely by the battery subsequent to the generation of the fault signal.

9. A backup power circuit according to claim 8 with the low battery voltage sensor in its high impedance current block state, wherein restoring the power parameter to its normal condition resets the low battery voltage sensor to its normal low impedance current passing state the restored power parameter constituting the reset voltage.

* * * * *